United States Patent Office 3,510,401
Patented May 5, 1970

3,510,401
PRODUCTION, RECOVERY AND APPLICATION OF ENZYMATICALLY ACTIVE MICROORGANISMS
Eugene H. Wegner, Bartlesville, Okla., assignor to Phillips Petroleum Company, a corporation of Delaware
No Drawing. Filed May 12, 1966, Ser. No. 549,472
Int. Cl. C12d 1/00
U.S. Cl. 195—51                                                  9 Claims

ABSTRACT OF THE DISCLOSURE

Enzymatically active microorganisms adapted to the conversion of hydrocarbons by growth in relatively non-volatile hydrocarbons are substantially freed of such nutrient hydrocarbon by extraction with a relatively volatile hydrocarbon solvent having from 4 to 7 carbon atoms per molecule and residual solvent hydrocarbon is removed by suitable vaporization means without impairing the activity of said microorganisms.

Alicyclic hydrocarbons are oxidized to the corresponding oxidized products in the presence of microorganisms conditioned to hydrocarbons during the growth stage by including a different hydrocarbon as at least part of the nutrient during the growth stage.

The oxidation of hydrocarbons in the presence of microorganisms pre-conditioned to hydrocarbons during the growth cycle can be controlled and the product distribution modified under substantially non-growth conditions by the addition of a fermentable nutrient selected from carbohydrates and carboxylic acids to the oxidation system.

---

This invention relates to enzymatically active microorganisms. More particularly, the invention relates to the production of enzymatically active microorganisms suitable for application in hydrocarbon conversion processes as well as the recovery and application of the microorganisms produced thereby.

In one aspect, the invention relates to a method for adapting enzymatically active microorganisms to the conversion of hydrocarbon feed stocks by contacting the microorganisms with relatively volatile hydrocarbon during the growth cycle. In another aspect, this invention relates to the adaptation of microorganisms to hydrocarbon by contacting the microorganism during the cycle with a hydocarbon having up to abous six carbon atoms. In another aspect, the invention relates to a method for preconditioning microorganisms during the growth cycle with relatively volatile hydrocarbons and subsequently separating the volatile hydrocarbon and growth product. In yet another aspect, the invention relates to a method for separating residual volatile hydrocarbon from microbial cellular material by flashing the mixture at reduced pressures. In another aspect, the invention relates to a method for removing residual relatively non-volatile hydrocarbon from living enzymatically active microorganisms by washing and/or extracting the mixture with a relatively volatile hydrocarbon. In another aspect, the invention relates to a method for separating mixtures of relatively non-volatile hydrocarbon and microbial cellular material by extracting the mixture with a relatively volatile hydrocarbon solvent from about 4 to about 7 carbon atoms per molecule. In yet another aspect, the invention relates to a method for removing relatively non-volatile hydrocarbon from microbial cellular material by contacting the mixture with a relatively volatile hydrocarbon and separating the two mediums by filtration, centrifugation, decantation and/or cyclone washing. In yet another aspect of this invention, microbial cellular material is substantially freed of hydrocarbon by extraction with a relatively volatile hydrocarbon solvent to remove relatively non-volatile hydrocarbon and subsequently flashing the volatile hydrocarbon solvent. In yet another aspect, this invention relates to the oxidation of alicyclic hydrocarbons under non-growth aerobic conditions in the presence of enzymatically active microorganisms preconditioned to hydrocarbons during a growth cycle. In yet another aspect, the invention relates to the oxidation of cyclohexane and cyclohexene in the presence of enzymatically active microorganisms. In yet another aspect, the invention relates to the oxidation of cyclohexane and cyclohexene under aerobic conditions and in the presence of enzymatically active microorganisms such as bacteria and/or yeast. In yet another aspect, the invention relates to the oxidation of cyclohexane and cyclohexene in the presence of bacteria such as Nocardia species or yeasts such as Candida species. In yet another aspect, the invention relates to a method for modifying microbial oxidation products by varying the composition of the nutrient base employed in the reaction zone. In yet another aspect, the invention relates to a method for modifying the product distribution resulting from the enzymatic oxidation of hydrocarbons through the action preconditioned microorganisms by conducting the oxidation in the presence of a minor amount of glucose. In yet another aspect, the invention relates to a method for controlling the microbial oxidation of hydrocarbons by conducting such oxidation in the presence of a predetermined amount of glucose. In yet another aspect, the invention relates to a method of increasing the alcohol to ketone product ratio resulting from the microbial oxidation of alicyclic hydrocarbons by conducting such oxidation in the presence of glucose. In yet another aspect, the invention relates to a method for increasing the microbial oxidation rate of alicyclic hydrocarbons by conducting such oxidation in the presence of glucose.

The conversion of hydrocarbons by growing microbial cellular material, usually in an oxidative metabolism is generally well known. The products derived from such enzymatic action generally depend on the types of organism and feed stock employed as well as the environmental conditions and nutrient substrate maintained during the growth cycle, the oxidation conditions and the extent to which the oxidation fermentation is allowed to proceed.

Generally, the ability of any given microorganism to consume or convert hydrocarbons is determined in large part by the specific characteristics of the hydrocarbons to which the microorganism is adapted during the growth cycle. This consideration generally limits the applications that can be made of enzymatically active microorganisms developed by such techniques and intended to be used for the conversion of hydrocarbons by oxidative metabolism. This generally results from the fact that the most economical feed stocks on which to grow such microorganisms are not those of which ultimate conversion is desired in many instances. However, it has been found that such microorganisms can be grown on readily available feed stocks such as the relatively complex hydrocarbon mixtures found in diesel fuels or cycle oils as for dewaxing. The microbial cells grown in such means can be separated from the mixtures of oil and metabolic products and used to inoculate relatively select hydrocarbon feedstocks to produce the oxidative products thereof, such as $C_{10}$–$C_{16}$ alcohols, in the absence of cell growth.

This conversion, rather than being the result of oxidative metabolism and resulting in the production of substantial quantities of proteins by cell growth, is apparently the consequence of enzymatic metabolism or conversion; the enzyme being formed in the growth step and being continually renewed by the live cells transferred into the second medium comprising the selected hydrocarbon feedstock. It is well known that enzymes, being biological catalysts, are highly active and specific in their reaction characteristics and that they are able to convert to the desired products large quantities of the selected feed material without substantial deterioration.

It is also known, however, that microorganisms will attack the particular hydrocarbon to which it was exposed during the growth cycle in preference to hydrocarbons other than the growth hydrocarbon. Therefore, if the microbial growth product is not freed of growth hydrocarbon, it will preferentially attack the residual growth hydrocarbon in a subsequent conversion step. Such procedure results not only in diminution of the effective activity of the microorganism in converting the desired hydrocarbon, but also results in the contamination of the desired product with feed hydrocarbon conversion products.

In practice, the separation of pure enzyme is extremely difficult and costly and, as a result, is not generally economically feasible. However, through the efficient separation of the developed microorganism from the growth medium it is possible to produce a living enzymatically active microbial cellular material suitable for inoculating selected hydrocarbon feedstocks for conversion thereof by enzymatic metabolism in the absence of cell growth.

One substantial difficulty encountered in this approach is the task of effectively separating the enzymatically active living cells from the adhering residual relatively non-volatile hydrocarbon. The manner of separation employed must necessarily be one that does not result in any substantial modifications of the characteristics of the cellular material. In order to provide for the efficient recovery of unimpaired enzymatically active cells the separation techniques employed to remove residual growth hydrocarbon must be relatively mild both physically and chemically to avoid either damaging the cellular structure or modifying the essential chemical composition of the living organism. At the same time, however, the method of separation employed must be adequate to remove substantially all of the growth hydrocarbon from the cellular material to avoid the possibility that any significant amount of such growth hydrocarbon is carried over into the non-growth conversion step.

Separation techniques generally employed in the cleaning of such microbial cellular material generally result in the loss of a substantial part of the activity of the organism and a subsequent increase in the cost of preparing a sufficient amount of such material to accomplish the desired conversion. Usually, the cells are separated from the bulk of the growth phase by suitable means such as centrifugation or filtration and are further subjected to repeated washings, usually with water, which may also contain surfactants. Such repeated washings are not only time consuming, but also require substantial investment in process equipment. In addition, some of the surfactants employed in such separations are bactericidal and therefore cannot be used when the recovery of enzymatically active live cells is required.

It is therefore one object of this invention to provide a method for the production of substantially oil-free microbial cells. It is another object of this invention to provide for the production of substantially oil-free microbial cells the physical structure and chemical composition of which are substantially unimpaired. It is another object of this invention to provide for the production of enzymatically active living microorganisms acclaimed to hydrocarbon yet substantially free of growth hydrocarbon. It is another object of this invention to provide for the production of enzymatically active living microorganisms suitable for the oxidation of hydrocarbons. It is yet another object of this invention to provide for the production of enzymatically active microbial cellular material adapted to hydrocarbon during growth cycle yet sufficiently free of growth nutrient hydrocarbon for use in non-growth oxidation of hydrocarbons other than the growth hydrocarbon by enzymatic metabolism.

It has also been found that the course of the hydrocarbon oxidation induced by enzymatic metabolism in a non-growth medium and in the presence of enzymatically active microorganisms adapted to hydrocarbon during the growth cycle can be substantially altered to considerable advantage through the expedient of modifying the composition of the nutrient substrate employed to sustain the microorganism in the oxidation zone. It has been shown that the course of fermentation in cetrain biochemical processes can be changed by altering the composition of the nutrient solution employed. For example, in the fermentation of sugars to produce ethanol, the production of glycerol which is generally a nuisance by-product can be increased to the point where glycerol becomes the primary product and ethanol a secondary or by-product. This result is achieved by the addition of sodium sulphite to the mash to be fermented and by adjusting the pH to produce the slightly alkaline solution. Through such operations the yield of glycerol can be increased to as much as 30 percent thereby making its recovery not only feasible but highly desirable.

Since it has been found that the oxidation of hydrocarbon by the enzymatic metabolism induced in a non-growth environment by living microorganisms adapted to hydrocarbons during the growth cycle results in a distribution of several products, it would be desirable to control the course of such oxidations to optimize the production and recovery of the most desirable of these several oxidized species.

It is therefore another object of this invention to provide a method for controlling the course of hydrocarbon oxidation by enzymatic metabolism in non-growth systems. It is another object of this invention to provide a method for optimizing the yield of alcohols in the enzymatic oxidation of alicyclic hydrocarbons. Yet another object of this invention is to provide for a method for increasing the yield of alcohols and simultaneously suppressing the yield of ketones in the enzymatic non-growth oxidation of cyclohexane and cyclohexene. Yet another object of this invention is to provide a method for increasing the overall conversion rate of cyclohexane and cyclohexene to the oxygenated derivatives thereof in enzymatically promoted non-growth oxidation.

In accordance with one embodiment of this invention, microorganisms are adapted to the conversion of hydrocarbons during the growth cycle by contacting the microorganism dispersed in a nutrient medium with relatively volatile hydrocarbon and subsequently separating the volatile hydrocarbon from the microbial growth product by suitable means of evaporation or fractionation. Such procedure avoids the detrimental successive extraction of the cellular growth material otherwise required by preventing the degradation of the cellular structure or modification of the chemical composition of the microorganism.

More specifically, in accordance with this invention, a suitable microorganism to be adapted for hydrocarbon conversion is suspended in an aqueous nutrient medium wherein it is contacted with relatively volatile hydrocarbon under conditions which are sufficient to promote the consumption of at least part of the volatile hydrocarbon by metabolic action of the growing microorganism.

The essential characteristic of the hydrocarbons employed in this particular embodiment is that they can be readily volatilized at conditions of temperature and pressure that are not detrimental to the essential characteristics of the living microorganism. The hydrocarbons presently preferred for the process of this embodiment are those having from 1 to about 6 carbon atoms per molecule. It has been found that such hydrocarbons can be rapidly and easily removed from the microbial cellular material following the completion of the desired growth.

After the desired degree of growth of the microorganism has taken place during which time the organism has become adapted to the nutrient hydrocarbon, the hydrocarbon gases are removed by any suitable means such as selective volatilization or flashing. Where relatively low boiling hydrocarbon is employed during the growth cycle or is found to be present subsequent to the completion of the desired period of growth, the system can be flashed at reduced pressure to effect the substantially complete separation of nutrient hydrocarbon and microbial growth product.

This treatment in no way affects the viability of the organisms nor does it result in the destruction of the enzymes contained in the cellular material. On the contrary, such procedure leaves the microbial cellular materials substantially unaltered in the aqueous nutrient solution and substantially free of oily deposits. The enzymatically active cellular material can then be separated from the nutrient liquid medium by any suitable means that is not so physically severe as to result in the degradation of the cellular structure. Such separation can be effected by centrifugation and/or suction filtration with the consequent production of a clean, cellular material which is biologically active and substantially unimpaired. The material thus recovered can be employed immediately to promote the oxidation of hydrocarbons under aerobic conditions or, if desired, the enzymatically active cellular material can be stored for considerable periods of time under suitable refrigeration.

The microorganism thus recovered can be employed to inoculate liquid hydrocarbons under aerobic conditions to promote the conversion of such hydrocarbons by enzymatic metabolism in the absence of cell growth to yield the corresponding oxygenated derivatives of the feed hydrocarbon such as alcohols, aldehydes, ketones or carboxylic acids. The products obtained from such oxidation and the distribution of such products depends upon the nature of the feed hydrocarbon, the conditions of the oxidation and the extent to which the interaction is allowed to progress.

The characteristics of the nutrient medium should be such that it is sufficient to maintain the life of the microorganism while not promoting the growth thereof. Nutrient substrates generally employed to support the growth of such microorganisms comprise suitable sources of nitrogen and carbon and trace metals such as iron, cobalt, manganese, etc., preferably the water soluble salts thereof, depending on the specific organism. These nutrient substrates can be modified to provide non-growth nutrients as desired in this particular application simply by omitting the nitrogen source from the growth nutrient composition.

After the microorganisms have been employed in such oxidations for a period of time they may exhibit some decrease in activity due to the fact that the nutrient medium and hydrocarbons present in the oxidation zone do not promote the growth and consequent reactivation of the microorganism. In this event, the cells can be reactivated by subjecting them to another growth cycle of sufficient duration to replenish the active enzyme and increase this concentration to the desired level. This regrowth operation can be effected either in the oxidation medium in the present of hydrocarbon to be oxidized by enzymatic metabolism or the cellular material may be removed from the oxidation zone by suitable means and contacted with growth hydrocarbon in the substantial absence of material not essential to the growth cycle. Where the microorganism is reactivated by the latter procedure, it can be separated from the growth nutrient medium and growth hydrocarbon by the techniques already described and reused to inoculate and oxidize the desired hydrocarbon feedstocks.

The following example serves to illustrate, in one particular case, the application of this growth process to the production of one suitable microorganism.

EXAMPLE I

A Nocardia culture was grown on a nutrient growth composition comprising the following materials dissolved in deionized water:

| Substance | Wt. percent |
|---|---|
| $(NH_4)SO_4$ | 0.1 |
| $Na_2HPO_4$ | 0.05 |
| $KH_2PO$ | 0.05 |
| $MgSO_4 \cdot 7H_2O$ | 0.02 |
| $Na_2CO_3$ | 0.01 |
| $CaCl_2$ | 0.01 |
| $FeSO_4 \cdot 7H_2O$ | 0.0005 |
| $MnSO_4$ | 0.0002 |
| Yeast extract | 0.1 | in an atmosphere of 20 weight percent propane and 80 percent air for 7 days. (Cultures have been grown under these conditions for periods up to 21 days.) Growth was slow but good. The supply of propane was discontinued and the cell mass was recovered by filtration from the liquid medium, frozen and stored. The cell yield was 1.2 weight percent of dried cells based on total oxidation medium after 10 days.

This example is intended only to be illustrative of one particular application of this embodiment of this invention and should in no way be construed to limit the application of this concept.

A portion of the frozen active material produced by the method illustrated in the example can be incubated in aqueous medium under appropriate conditions and in the presence of a suitable buffer together with the hydrocarbon to be oxidized under aerobic conditions with the consequent conversion of the feed hydrocarbon to its corresponding oxygen derivatives. The buffer material preferred in this embodiment of this invention is a suitable phosphate and can be employed in concentrations adequate to maintain the desired pH value in the oxidation medium. Preferably, the concentration of phosphate buffer in this particular embodiment is 0.6 weight percent. The hydrocarbon to be oxidized can, of course, be any suitable material saturated or unsaturated, cyclic or noncyclic, substituted, branched or straight chained. Where the material is incubated at room temperature, the enzymes immediately convert the feed hydrocarbon substrate into oxygenated product; the product derived in the specific case illustrated in the example generally being primary alcohol. However, aldehydes, ketones, and acid conversions are also possible. The products appear in a matter of minutes after the initial inoculation and with continuous passage of feed in and out of the conversion zone, control of the degree of conversion and production rate can be readily controlled.

The microorganisms are suitable for oxidizing hydrocarbon feedstocks, particularly aliphatic and branched alicyclic hydrocarbons having from about 6 to about 20 carbon atoms. They are also particularly adaptable to the oxidation of n-paraffinic hydrocarbons having from about 10 to about 16 carbon atoms to produce the corresponding detergent grade primary alcohols.

Obviously, the process as described is readily adaptable to both batch and continuous operation. Product analysis can be effected by any suitable means such as gas liquid chromatography for the purpose of modifying feed rates or reaction conditions to control degree of conversion, production rates and product characteristics and distribution. The product stream either from batch or continuous operation, containing microbial cellular material as well as feed hydrocarbon and oxygenated products can be separated to recover the cellular material for recycle to the growth zone and recovery of product, if desired. However, this product stream, without separation, can be passed to a subsequent second conversion zone for the purpose of improving the degree of conversion or modifying the characteristics of the oxygenated product or altering the distribution thereof.

Any suitable species of microorganisms which are able to grow on a relatively volatile hydrocarbon material and which will produce the desired oxygenated derivatives of substrates in a non-growth enzymatically active state are suitable for utilization in the process of this embodiment. Examples of such suitable microorganisms are yeasts such as *Candida lipolytica, Candida pulcherrima, Candida utilis*, torulopsis species, oidium species, neurospora species, mycoderma species, bacteria of the orders pseudomonales, eubacteriales and actinomycetales of the families bacillaceae and pseudomonadaceae of the species *Pseudomonas aeruginosa, Bacillus subtilis,* micrococcus species, corynebacterium species, nocardia species, flavobacterium species, actinomyces species, molds such as penicillium species, aspergillus species, and hormodendrum species.

Excess biologically active material produced in the growth stage of the process of this invention can be frozen, if desired, and stored to preserve its activity for subsequent application as inoculating material for the conversion of suitable hydrocarbon substrate or the excess material can be processed to recover proteins and other products as those produced by ordinary fermentation processes by conventional methods. Also, by proper selection of biological species, conditioning, adaptive procedure, hydrocarbon substrate feed to the oxygenation zone and residence time, the main product constituent can be varied to supply a considerable variety of oxygenated products.

In accordance with yet another embodiment of this invention, enzymatically active microbial cellular material adapted to the conversion of hydrocarbon during the growth of the microorganism can be substantially purified and separated from the residual relatively non-volatile hydrocarbon material present during the growth cycle by washing with sufficient quantities of lower molecular weight relatively volatile hydrocarbon solvent which solvent can be subsequently separated from the cellular material to produce a relatively hydrocarbon-free enzymatically active living microorganism adapted to the conversion of hydrocarbons.

More specifically in accordance with this embodiment of this invention, an enzymatically active living microorganism adapted to the conversion of hydrocarbons during the growth cycle by supplying at least part of the nutrient substrate during the growth cycle a hydrocarbon of relatively low volatility at reaction conditions, can be substantially freed of the residual relatively non-volatile hydrocarbon after the desired growth has taken place by washing the suspension of cellular material and residual hydrocarbon with a relatively volatile hydrocarbon solvent having sufficient vapor pressure to allow the rapid removal thereof from the living cellular material at conditions of temperature and pressure that do not result in any substantial detriment to either the cellular structure or chemical composition of the microorganism.

The growing cells are generally suspended in an aqueous nutrient medium in intimate contact with the hydrocarbon phase which is at least in part consumed by the metabolic action of the growing cellular material. Such contact with and consumption of hydrocarbons during the growth cycle is effective not only in adapting the microorganism for the consumption of that particular species of hydrocarbon present during the growth cycle, but is also effective in enhancing the activity of the enzymes present in the microorganism toward chemically similar species of hydrocarbons.

Following the completion of the desired growth period the microorganisms containing some residual hydrocarbon can be separated from the bulk of the aqueous phase as remaining nutrient hydrocarbon by conventional phase separation means such as filtration, centrifugation, or decantation with the provision that such separations are not so physically severe as to result in any substantial detriment to the cellular structure of the microorganism. The wet cells are then contacted with sufficient quantities of relatively volatile hydrocarbon solvent to dissolve and remove substantially all of the residual hydrocarbon. Such contacting can be effected by any one of numerous conventional means, the primary consideration again being that such treatment is not so severe as to result in the destruction of cellular structure. The resultant cellular material, substantially free of residual hydrocarbon, can then be separated from the bulk of the relatively volatile hydrocarbon solvent by such means as filtration, centrifugation, decantation and others. The resultant relatively concentrated cellular suspension can then be subjected to conditions of temperature and pressure sufficient to effect the vaporization and removal of volatile hydrocarbon solvent remaining in the cellular phase.

In the presently preferred embodiment of this invention, the solvent extraction of the wet cells is carried out on non-compacted layers of cellular material by vertical displacement of the residual water and subsequent solution of the adhering oil layer as the solvent is drawn through the cell mass. Such procedure, although not as rapid as other available means of separation and washing, subjects the microbial cellular material to only very mild physical treatment and thereby prevents any substantial damaging of the cellular structure or modification of chemical composition or enzymatic activity of the microorganism. Preferably, light hydrocarbons having from 4 to 7 carbon atoms per molecule are used as the selected solvent in the above-described separation of nutrient hydrocarbon from the growth product. These light hydrocarbons rapidly dissolve the residual nutrient relatively heavy hydrocarbon without killing the cells. The solvents are also quite easily removed from the resultant concentrated cellular suspension, together with residual water, in a drying operation or, as in the preferred embodiment of this invention, by vacuum flashing. Although there are numerous hydrocarbons having sufficient volatility and solvency toward the nutrient hydrocarbon and that would consequently be suitable for application as solvents for removal of the nutrient hydrocarbon from the growth product, it is presently preferred in this embodiment to employ as such solvents either heptane or hexane. It has been found that the lighter hydrocarbons, such as the butanes and pentanes, although being very efficient in removal of residual nutrient hydrocarbon, are deterimental to the living microorganism to the extent that they will dissolve a portion of the lipid materials essential to the sustained activity of the microorganism during prolonged contact.

In practice, the specific method of solvent extraction employed depends on the nature of the cellular material and the subsequent use to be made of the microorganism. For example, in the purification of certain microorganisms, a dense, closely packed mass of cellular material is formed where filtration-suction type operations are employed to effect the separation. In such instances, the reduced porosity and diminished permeability of the resultant cellular mass poses problems in the subsequent solvent extraction operations in that solvent penetration is made more difficult. In such instances, however, this difficulty can be obviated by accomplishing the initial separation by centrifugal extraction.

The mixture of solvent and extracted hydrocarbon recovered from the washing operation can be separated by any suitable selective vaporization operations, such as by flashing at reduced pressure. The substantially purified solvent hydrocarbon removed as overhead can be condensed and recycled to the extraction or washing apparatus and the relatively heavy nutrient hydrocarbon fraction can be returned to the growth step previously described.

Although there are numerous hydrocarbons and mixtures thereof that can be satisfactorily employed as the growth nutrient hydrocarbon in the presently preferred embodiment of this invention, it is generally preferred to use relatively inexpensive mixtures of hydrocarbons having from about 10 to about 30 carbon atoms per molecule. It is also preferred that the mixture contain a substantial amount of aliphatic hydrocarbons or hydrocarbons having aliphatic side chains and desirably a substantial amount of paraffinic hydrocarbon structure. The concentration of inoculate microbial material employed in the cell growth cycle can vary considerably although it is generally desirable to inoculate the growth hydrocarbon with from about 0.01 to about 1.0 weight percent active microbial cells based on hydrocarbon. In the presently preferred embodiment of this invention, the temperature during the growth cycle can be maintained within the range of from about 60 to about 115° F. for a period of from about 1 to about 48 hours. However, the conditions of temperature and reaction time during the growth cycle can vary considerably depending upon the rate and degree of cellular growth and/or hydrocarbon conversion that is desired.

Although the solvent hydrocarbons employed to remove residual nutrient hydrocarbon from the microbial growth product are very selective toward the growth hydrocarbon as compared to the lipid materials within the cells, the selectivity is only relative and it is, therefore, unavoidable that, depending upon the severity of the washing operation, some minor amount of cell lipids will be removed along with the residual growth hydrocarbon. The removal of these materials which are necessary to the maintenance of active microbial cells can be substantially minimized and essentially eliminated through discreet control of the degree and severity of the solvent extraction step. In this operation, it is presently preferred to employ from about 0.1 to about 10 parts by weight solvent hydrocarbon based on weight of cellular material at an extraction temperature of from about 32 to about 140° F. and a pressure of from about 5 to about 500 p.s.i.a. These conditions can, of course, be varied considerably depending upon the degree of nutrient hydrocarbon removal and the rate of removal that is desired. As previously mentioned, the presently preferred method of removing the bulk of the solvent hydrocarbon from the microbial cells following the extraction operation is by the controlled volatilization or flashing of the relatively light hydrocarbons employed as solvents. It is presently preferred to effect this removal of solvent hydrocarbon at a temperature of from about 32 to about 220° F. and a pressure of about 1 to about 200 p.s.i.a. depending upon the particular hydrocarbon solvent employed and the nature of the cellular product.

In way of illustration, the purification process described was tested on cell masses resulting from the microbial dewaxing of diesel fuel inoculated with Candida species yeast. The separation of residual hydrocarbon from the growth product produced in this system is particularly difficult. However, the substantially complete separation of residual hydrocarbon and growth product was accomplished quite rapidly by the separation operation described hereinabove and damage to the cellular material was essentially completely avoided. The yeast cells produced in this system are generally spherical or ovoid and are not excessively compacted in mild filtration operations. As a result, adequate separation was achieved by vertical displacement using only mild differential pressure, or suction. The cells were extracted with heptane and hexane and in both instances an oil-free clean cell concentrate containing viable cellular materials easily processable to the desired end product were obtained.

The enzymatically active microbial cellular materials produced by the above-described methods are particularly useful as inoculating materials for subsequent conversion of similar species of hydrocarbon feedstocks similar to those on which the microorganisms are adapted during the growth cycle. The high purity of these product cells and the substantial absence of nutrient hydrocarbon in the final product, enable the application of these materials as inoculates for the microbial oxidation of species of hydrocarbons other than those present during the growth cycle. The high degree of purity achieved by these techniques affords additional advantage in that the resultant microbial material can be stored under suitable refrigeration for extended periods of time without appreciable loss of enzymatic activity. These materials, after having been stored for a period of time, can be incubated and employed to inoculate selected hydrocarbon feedstocks under aerobic conditions to produce the corresponding oxygenated derivatives. In the presently preferred embodiment of this invention, the hydrocarbons to be oxidized generally have from about 6 to about 20 carbon atoms and can be saturated or unsaturated, cyclic, branched cyclic, or aromatic hydrocarbons. However, it has also been found that a very suitable application of this microbial oxidation system is found in the oxidation of the n-paraffinic hydrocarbons having from about 10 to about 16 carbon atoms under conditions regulated so as to effect a substantially high degree of conversion of the feed hydrocarbon to primary alcohols of detergent grade.

It has also been discovered that the course of certain microbiological transformations can be controlled and the products of such conversion can be changed by modifying the composition of the nutrient medium present during the conversion step. More specifically, it has been found that not only the rate of conversion, but also the product distribution can be substantially modified by adding to the subsistence medium a substance which may normally be a fermentable nutrient, but which in addition of this particular application also acts to suppress or modify the production of one or more of the conversion products in microbial conversion systems.

More specifically, it has been found that certain yeasts and bacteria conditioned during the growth cycle to oxidize hydrocarbons, exhibit substantial activity in the oxidation of alicyclic hydrocarbons, particularly unbranched alicyclic hydrocarbons in an enzymatic oxidation process involving practically no growth of the microorganism. In this particular application, it is presently preferred to employ n-paraffinic hydrocarbons during the growth cycle for the purpose of adapting the bacteria or yeast to the subsequent conversion of dissimilar hydrocarbons.

For example, in an enzymatic oxidation process, alicyclic hydrocarbons are oxidized under aerobic conditions to the corresponding ketones which conversion is, of course, highly desirable. However, it has been found that the conversion of the alicyclic hydrocarbon to the corresponding ketone can be substantially suppressed in favor of conversion of the hydrocarbon feedstock to the corresponding alcohol by modifying the composition of the nutrient substrate employed to sustain the microorganism during the oxidation reaction. For example, it has been found that the addition of as little as 0.1 weight percent of glucose to the aqueous oxidation medium results not only in the substantial increase in the ratio of alcohol to ketone in the final product, but also serves to considerably increase the overall conversion rate of hydrocarbon. The cyclic alcohol produced in such conversions is also a highly desirable commercial product. Therefore, as both of the primary products of such conversions have substantial market value, the process of this embodiment affords the advantage of being able to produce at will, with the same organism-enzyme combination, whichever product is more valuable or desirable. The microorganisms adapted to the conversion of hydrocarbons by the methods described hereinabove are used to inoculate a fermentation system which generally comprises an alicyclic hydrocarbon to be oxidized and an aqueous phase containing a suitable nutrient medium and dissolved oxygen. It is also generally desirable to maintain the pH of the aqueous phase at a value of about 7 by adding thereto a small amount of a suitable buffering compound such as $KH_2PO_4:K_2HPO_4$. The hydrocarbon feed to the oxidation zone can comprise in this particular embodiment any suitable alicyclic hydrocarbon subject to enzymatic attack by the enzymes contained in the hydrocarbon preconditioned microorganisms. The alicyclic hydrocarbons are preferably those having from about 6 to about 14 carbons contained in one or more ring structure. These compounds may or may not contain pendant side chains. However, I have found that this process finds particular application to the oxidation of unbranched alicyclic hydrocarbons which may or may not contain points of olefinic unsaturation within the ring structure.

The operation of this invention is adequately illustrated with reference to the oxidation of hydrocarbons comprising either cyclohexane or cyclohexene or a mixture of both in the desired proportions. During the continuance of the oxidation, the temperature of the system should be maintained within the range of from about 60° F. to about 115° F. depending upon the particular type of microorganism employed. Also, to promote intimate contact between the hydrocarbon phase and the aqueous phase containing microorganism, it is advantageous to provide for suitable means of agitating the reaction mixture either intermittently or continuously during the course of the conversion. Such agitation provides the added advantage of promoting the contact of both liquid phases with the atmosphere and thereby promotes the solution of oxygen in the liquid phase, the presence of which is necessary to the maintenance of the oxidation reaction. Similarly, oxygen can be provided to the system by bubbling of air or similar mixture of oxygen through the liquid phases during the course of the reaction. An added advantage of this latter approach is that it provides a substitute means for achieving the desired degree of agitation that in certain situations can serve to alleviate the necessity for providing for additional means for agitation.

The amount of dissimilar fermentable nutrient added to the aqueous phase during the course of the reaction will depend, of course, upon the final product distribution desired. For example, where the hydrocarbon feedstock is cyclohexane and/or cyclohexene and the additional fermentable nutrient is glucose, the rate of conversion of the cyclic hydrocarbon to the corresponding alcohol is increased by the addition of glucose either at the beginning or during the course of the oxidation with a concurrent relative loss in the production of the corresponding ketone. Of course, the optimum conversion of hydrocarbon to ketone is achieved in the complete absence of the additional nutrient. Conversely, conversion to the alcohol is enhanced by the addition of as little as 0.1 weight percent to glucose although optimum alcohol production is obtained at higher concentrations of the additional fermentable nutrient.

Numerous species of yeast and bacteria are suitable microbial agents to effect the described conversion. These include essentially any microorganism that can be adapted to the conversion of hydrocarbon during a growth cycle employing paraffinic hydrocarbon as nutrient substrate. For example, suitable species of microorganisms are yeasts such as *Candida lipolytica, Candida pulcherrima, Candida utilis,* torulopsis species, oidium species, neurospora species, mycoderma species, bacteria of the orders pseudomonales, eubacteriales and actinomycetales of the families bacillaceae and pseudomonadaceae of the species *pseudomonas aeruginosa, Bacillus subtilis,* micrococcus species, corynebacterium species. nocardia species, flavobacterium species, actinomyces species, molds such as penicillium species, aspergillus species, and hormodendrum species.

Similarly, the additional fermentable nutrients that can be employed to effect the described modifications of relative and absolute conversions of alicyclic hydrocarbons are numerous. Generally, carbohydrates and carboxylic acids having up to about 12 carbons, such as acetic, hexanoic, capric, n-butane dicarboxylic, and n-octane dicarboxylic acids, glucose and lactose are preferred modifiers in this respect. The degree of the desired effect of these additives is generally dependent on the concentration of the nutrient in the reaction medium, and, qualitatively, their influence is substantially the same at all concentrations. However, it is generally preferred for reasons of practicality, to conduct the described oxidation in the presence of from about 0.1 to about 30 weight percent based on aqueous phase. We have found, however, that it is generally more preferable to maintain the concentration of the additional fermentable nutrient at a relatively low level within the range of from about 0.1 to about 0.5 based on total reaction mixture.

In way of illustrative example, a system comprising primarily deionized water and having therein 3 weight percent cyclohexene, 0.6 weight percent phosphate buffer, pH 7 was inoculated with 5 weight percent of nocardia species bacteria preconditioned on paraffin hydrocarbon. During the oxidation, air was bubbled through the mixture to supply oxygen thereto and to provide sufficient agitation and contact between the hydrocarbon and aqueous phases. Three such runs were made employing identical compositions except for the amount of glucose added in each operation. Oxidation was allowed to continue for a period of 19 hours at a temperature of 75° F. after which time a representative sample of the hydrocarbon phase was extracted and analyzed by gas-liquid chromatography to provide the following results.

TABLE

| Glucose, wt. percent | Hydrocarbon conversion, percent | Relative concentrations | |
|---|---|---|---|
| | | Ketone | Alcohol |
| | 1.7 | 1.3 | 0.4 |
| 0.1 | 2.7 | 0.4 | 2.3 |
| 0.5 | 11.7 | 0.2 | 11.5 |

As is obvious from these data, the addition of as little as 0.1 weight percent glucose at the initiation of the oxidation reaction resulted in a substantial increase in alcohol production.

Similar conversions were obtained in operations employing cyclohexane as a hydrocarbon feed and nocardia species bacteria as the inoculate material having been preconditioned on the paraffinic hydrocarbon. In operations wherein the yeast such as candida species were employed as inoculating materials, the product yields were slightly lower, but the effect of glucose addition in these operations on product distribution and overall conversion rate was quite similar to the specific operations described. It should be emphasized that during each of these operations essentially no growth of the microorganism took place. It should also be pointed out that similar operations were attempted using nocardia species bacteria and various yeasts which had not been adapted to the conversion of hydrocarbons during the growth cycle with the result that no conversion of alicyclic hydrocarbon feedstock was observed.

Any of these operations can be readily adapted to either batch or continuous type processes through the exercise of expedients well known in the art. For example, the mixture of hydrocarbon and aqueous phase could be continuously withdrawn and subsequently separated by such means as distillation and the aqueous phase recycled to the oxidation reactor. The separated hydrocarbon phase could then be further fractionated to recover oxidized product in which event unconverted hydrocarbon feedstock could be recycled to the oxidation zone. Additional make-up enzymatically active microbial material could be continuously added either to the oxidation zone or to the aqueous phase recycled from the product separation step or the microorganisms present in this aqueous recycle could be subjected to a further growth cycle in the presence of the hydrocarbon on which they were initially adapted at suitable conditions and for a period of time sufficient to obtain the desired degree of activity.

Various modifications and variations of the concept of this invention as described in the disclosure and appended claims will be evident to those skilled in the art without departing from the spirit and scope of this invention, the essence of which is that there is provided a method for preparing enzymatically active microorganisms adapted for the conversion of hydrocarbons which method comprises contacting the microorganisms during the growth cycle with a supplemental nutrient hydrocarbon at conditions sufficient to promote consumption of at least a part of the nutrient hydrocarbon by the microorganism and the subsequent essentially complete separation of nutrient hydrocarbon from growth product; a method for the production of enzymatically active microorganisms adapted for the conversion of hydrocarbons and being essentially free of nutrient hydrocarbons by contacting the microorganisms with a suitable relatively non-volatile hydrocarbon during the growth cycle at conditions suitable to promote consumption of at least part of said non-volatile hydrocarbon by the microorganism, substantially completely removing the relatively nonvolatile nutrient hydrocarbon from the resultant growth product by extraction with a relatively volatile hydrocarbon and substantially completely removing the relatively volatile hydrocarbon from the growth product; and a method for modifying and/or controlling the course of the microbial oxidation of alicyclic hydrocarbons by effecting the oxidation in the presence of a minor amount of a fermentable nutrient material; and a method for oxidizing cyclohexane and/or cyclohexene at non-growth conditions to produce corresponding ketones and alcohols.

I claim:
1. A method for modifying the distribution of oxidized products produced by the enzymatic oxidation of alicyclic hydrocarbons containing from about 6 to 14 carbon atoms per molecule wherein said hydrocarbons are contacted under substantially non-growth aerobic conditions with a suitable microorganism dispersed in an aqueous phase preconditioned to hydrocarbons during the growth cycle, which method comprises conducting said oxidation in the presence of a fermentable nutrient material selected from the group consisting of carbohydrate and carboxylic acids having up to about 12 carbon atoms in an amount equal to about 0.1 to about 30 weight percent based on aqueous phase whereby the presence of said fermentable nutrient material suppresses the conversion of said alicyclic hydrocarbon to the corresponding ketone in favor of conversion of said alicyclic hydrocarbon to the corresponding alcohol.

2. The method of claim 1 wherein said alicyclic hydrocarbons are substantially unbranched alicyclic hydrocarbons containing 6 to 14 carbon atoms and wherein said conversion of said alicyclic hydrocarbons to the corresponding ketones is decreased in favor of conversion of said alicyclic hydrocarbons to the corresponding alcohol by increasing the amount of said fermentable nutrient material.

3. The method of claim 1 wherein said alicyclic hydrocarbon is unbranched and wherein said microorganism is a yeast or bacteria and said yeast is candida species and said bacteria is nocardia species.

4. The method of claim 3 wherein an additional fermentable nutrient is added to the mixture of alicyclic hydrocarbon and microorganism to increase production of alcohol in preference to ketone, said additional fermentable nutrient is glucose and is added to said mixture in an amount corresponding to from about 0.1 to about 0.5 weight percent of the total reaction mixture.

5. The method of claim 1 wherein said microorganism is dispersed in an aqueous phase in contact with said alicyclic hydrocarbon and wherein sufficient oxygen is supplied to the system to effect oxidation and wherein said aqueous phase also contains a buffer compound with a pH of about 7, and wherein said oxidation is conducted at a temperature of from about 60 to about 115° F.

6. The method of claim 5 wherein said alicyclic hydrocarbon is cyclohexane and comprises about three weight percent of the total mixture, said yeast is Nocardia species and comprises about five weight percent of the total mixture, and the remainder of said mixture comprises water having therein about 0.6 weight percent potassium phosphate buffer of pH 7.

7. The method of claim 3 wherein said alicyclic hydrocarbon is selected from cyclohexane and cyclohexene.

8. The method of claim 4 wherein said alicyclic hydrocarbon is selected from cyclohexane and cyclohexene.

9. A method for modifying the distribution of oxidized products produced by the enzymatic oxidation of an alicyclic hydrocarbon selected from the group consisting of cyclohexane and cyclohexene wherein said hydrocarbon is contacted under substantially non-growth aerobic conditions with a suitable microorganism preconditioned to paraffins during the growth cycle, which method comprises conducting said oxidation in the presence of an additional fermentable nutrient material, said additional fermentable nutrient is glucose and is added to said oxidation in an amount corresponding to from about 0.1 to about 0.5 weight percent based on total reaction mixture.

References Cited
UNITED STATES PATENTS
| | | | |
|---|---|---|---|
| 2,697,061 | 12/1954 | Harris et al. | |
| 3,268,412 | 8/1966 | Champagnat et al. | 195—3 |
| 3,268,419 | 8/1966 | Champagnat et al. | 195—82 |

FOREIGN PATENTS
| | | |
|---|---|---|
| 945,174 | 12/1963 | Great Britain. |

OTHER REFERENCES
Webley, D. M., et al., Nature, vol. 178, No. 4548, Dec. 29, 1956, pp. 1467–1468.

Takahashi J., et al., Agricultural and Biological Chemistry, vol. 27, No. 12, 1963, pp. 836–842.

MAURICE W. GREENSTEIN Primary Examiner

U.S. Cl. X.R.

195—3, 28, 82, 96